United States Patent
Kakinami et al.

(10) Patent No.: US 7,497,801 B2
(45) Date of Patent: Mar. 3, 2009

(54) POWER TRANSMISSION APPARATUS, DIFFERENTIAL GEAR, POWER DISTRIBUTION APPARATUS, AND HUB APPARATUS

(75) Inventors: Takuma Kakinami, Toyota (JP); Takeo Yamamoto, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 370 days.

(21) Appl. No.: 10/565,199

(22) PCT Filed: Jul. 8, 2004

(86) PCT No.: PCT/JP2004/010092

§ 371 (c)(1),
(2), (4) Date: Jan. 20, 2006

(87) PCT Pub. No.: WO2005/008091

PCT Pub. Date: Jan. 27, 2005

(65) Prior Publication Data

US 2006/0229154 A1    Oct. 12, 2006

(30) Foreign Application Priority Data

Jul. 23, 2003    (JP) .............................. 2003-278550

(51) Int. Cl.
*F16D 3/00* (2006.01)
*F16H 48/06* (2006.01)

(52) U.S. Cl. ...................... 475/222; 464/906; 464/145

(58) Field of Classification Search ................. 475/222; 464/143–145, 906
See application file for complete search history.

(56) References Cited

U.S. PATENT DOCUMENTS

| 2,822,880 | A |   | 2/1958 | Gregory |
| 2,875,599 | A |   | 3/1959 | Gregory |
| 3,451,497 | A | * | 6/1969 | Sampietro et al. ........... 180/360 |
| 4,129,345 | A |   | 12/1978 | Krude |
| 4,723,464 | A |   | 2/1988 | Welschof |
| 5,916,055 | A |   | 6/1999 | Wormbaecher |
| 6,227,979 | B1 | * | 5/2001 | Yamamoto et al. .......... 464/145 |
| 7,252,616 | B2 | * | 8/2007 | Wormsbaecher ............ 475/202 |
| 2005/0288108 | A1 | * | 12/2005 | Kuczera et al. ............. 464/173 |

FOREIGN PATENT DOCUMENTS

| AU | 630 400 | 10/1992 |
| GB | 510653 | 8/1939 |
| JP | 11-189003 | 7/1999 |

* cited by examiner

*Primary Examiner*—Tisha D Lewis
(74) *Attorney, Agent, or Firm*—Oblon, Spivak, McClelland, Maier & Neustadt, P.C.

(57) ABSTRACT

A power distribution apparatus of high reliability and long life and that can be reduced in size. A differential gear identified as a power transmission mechanism includes a drive shaft, a diff case provided with an opening that opens towards the drive shaft, constant velocity universal joints connected to the drive shaft, and side gears connected to drive shafts via the constant velocity universal joints. Outer races of the constant velocity universal joints are formed at the end of drive shafts. Inner races of the constant velocity universal joints are formed at side gears. The outer races are arranged so as to block an opening.

6 Claims, 9 Drawing Sheets

POWER TRANSMISSION APPARATUS, DIFFERENTIAL GEAR, POWER DISTRIBUTION APPARATUS, AND HUB APPARATUS

TECHNICAL FIELD

The present invention relates to a power transmission apparatus, particularly, a differential gear, a power distribution apparatus, and a hub apparatus employed in a vehicle.

BACKGROUND ART

A conventional power transmission apparatus is disclosed in, for example, Japanese Patent Laying-Open No. 11-189003.

DISCLOSURE OF THE INVENTION

In the power transmission apparatus disclosed in the aforementioned publication, a constant velocity universal joint is provided between two shafts. In general, a boot or the like is provided to protect the constant velocity universal joint. However, provision of such a boot poses the problem that the apparatus will be increased in size.

If the boot is fractured by being struck by a stone or the like, there is a possibility that the lubricant in the constant velocity universal joint will leak or be scattered in all directions.

The present invention is directed to solve the problems set forth above. An object is to provide a power transmission apparatus, a differential gear, a power distribution apparatus, and a hub apparatus that can be reduced in size and has superior durability.

A power transmission apparatus according to the present invention includes a first power transmission member, a casing with an opening that opens towards the first power transmission member, a constant velocity universal joint connected to the first power transmission member, and a second power transmission member connected to the first power transmission member via the constant velocity universal joint. An outer race of the constant velocity universal joint is formed integrally to a casing side end of the first power transmission member. An inner race of the constant velocity universal joint is formed integrally to the second power transmission member. The outer race is arranged so as to block the opening.

In the power transmission apparatus of the above-described structure, the possibility of dust and dirt entering through the opening is reduced since the outer race is arranged so as to block the opening. As a result, it is no longer necessary to provide a boot, allowing reduction in size. Furthermore, leakage of lubricant and the like from the opening can be prevented since the opening is blocked by the outer race. Thus, a power transmission apparatus having a long life and of high reliability can be obtained.

Further preferably, the first power transmission member is a drive shaft, the casing is a differential case (diff case) of the differential gear, and the second power transmission member is a side gear.

Further preferably, the first power transmission member is a propeller shaft, the casing is a differential carrier (diff carrier) of the differential gear, and the second power transmission member is an input shaft of the differential gear.

Further preferably, the first power transmission member is a propeller shaft, the casing is a casing of the power distribution apparatus, and the second power transmission member is an output shaft of the power distribution apparatus.

Further preferably, the first power transmission member is a drive shaft, the casing is a knuckle, and the second power transmission member is a hub.

Further preferably, the outer surface of the outer race has a spherical configuration, and the apparatus further includes a seal member brought into contact with the surface of the opening and the outer surface of the outer race.

In this case, intrusion of dust and dirt can be prevented more reliably by virtue of the sealing between the outer surface of the outer race and the surface of the opening by means of the seal member.

A differential gear according to an aspect of the present invention includes a side gear, and a first power transmission member connected to the side gear via a constant velocity universal joint. An end of the first power transmission member has an inner surface defining an internal cavity that opens towards the side gear. An outer race of the constant velocity universal joint is formed at the inner surface. An inner race of the constant velocity universal joint is formed at the surface of the side gear.

Since the end of the first power transmission member has an inner surface defining the internal cavity that opens towards the side gear, and the outer race of the constant velocity universal joint is formed at the inner surface in the differential gear according to the present invention structured as set forth above, the constant velocity universal joint is provided in the internal cavity. As a result, intrusion of dust and dirt into the constant velocity universal joint can be prevented even if a boot is not provided. Therefore, the differential gear can be reduced in size. Furthermore, leakage of a lubricant such as grease or oil of the constant velocity universal joint can be prevented since the power transmission is provided in the internal cavity. Thus, a differential gear having a long life and of high reliability can be obtained.

A differential gear according to another aspect of the present invention includes an input shaft, and a first power transmission member connected to the input shaft via a constant velocity universal joint. An end of the first power transmission member has an inner surface defining an internal cavity that opens towards the input shaft. An outer race of the constant velocity universal joint is formed at the surface. An inner race of the constant velocity universal joint is formed at the surface of the input shaft.

Since the end of the first power transmission member has an inner surface defining the internal cavity that opens towards an input shaft, and an outer race of the constant velocity universal joint is formed at that inner surface in the differential gear according to the present invention structured as set forth above, the constant velocity universal joint is provided in the internal cavity. As a result, intrusion of dust and dirt into the internal cavity can be prevented even if a boot is not provided. Therefore, the differential gear can be reduced in size. Furthermore, leakage of a lubricant such as grease or oil of the constant velocity universal joint can be prevented since the constant velocity universal joint is provided in the internal cavity. Thus, a differential gear of high reliability and having a long life can be provided.

A power distribution apparatus according to the present invention includes an output shaft, and an propeller shaft connected to the output shaft via a constant velocity universal joint. An end of the propeller shaft has an inner surface defining an internal cavity that opens towards the output shaft. An outer race of the constant velocity universal joint is formed at the inner surface. An inner race of the constant velocity universal joint is formed at the surface of the output shaft.

Since the end of the propeller shaft has an inner surface defining an internal cavity that opens towards the output shaft, and an outer race of the constant velocity universal joint is formed at the inner surface in the power distribution apparatus structured as set forth above, the constant velocity universal joint is provided in the internal cavity. As a result, intrusion of dust and dirt into the constant velocity universal joint can be prevented even if a boot is not provided. A power distribution apparatus that can be reduced in size can be provided. Furthermore, leakage of a lubricant such as grease or oil of the constant velocity universal joint can be prevented since the constant velocity universal joint is provided in the internal cavity. As a result, a differential gear of high reliability and having a long life can be provided.

A hub apparatus of the present invention includes a hub, and a first power transmission member connected to a rotational shaft via a constant velocity universal joint. An end of the first power transmission member has an inner surface defining an internal cavity that opens towards the hub. An outer race of the constant velocity universal joint is formed at the inner surface. An inner race of the constant velocity universal joint is formed at the surface of the rotational shaft.

Since the end of the first power transmission member has an inner surface defining an internal cavity that opens towards the rotational shaft, and an outer race of the constant velocity universal joint is formed at the inner surface in the hub apparatus structured as set forth above, the constant velocity universal joint is provided in the internal cavity. As a result, intrusion of dust and dirt into the internal cavity can be prevented even if a boot is not provided. Thus, a hub apparatus that can be reduced in size can be provided.

Furthermore, leakage of a lubricant such as grease or oil of the constant velocity universal joint can be prevented since the constant velocity universal joint is provided in the internal cavity. A hub apparatus of high reliability and having a long life can be provided.

In accordance with the present invention, a power transmission apparatus having a long life and of high reliability, and that can be reduced in size, can be provided.

BEST MODES FOR CARRYING OUT THE INVENTION

Figure 1:
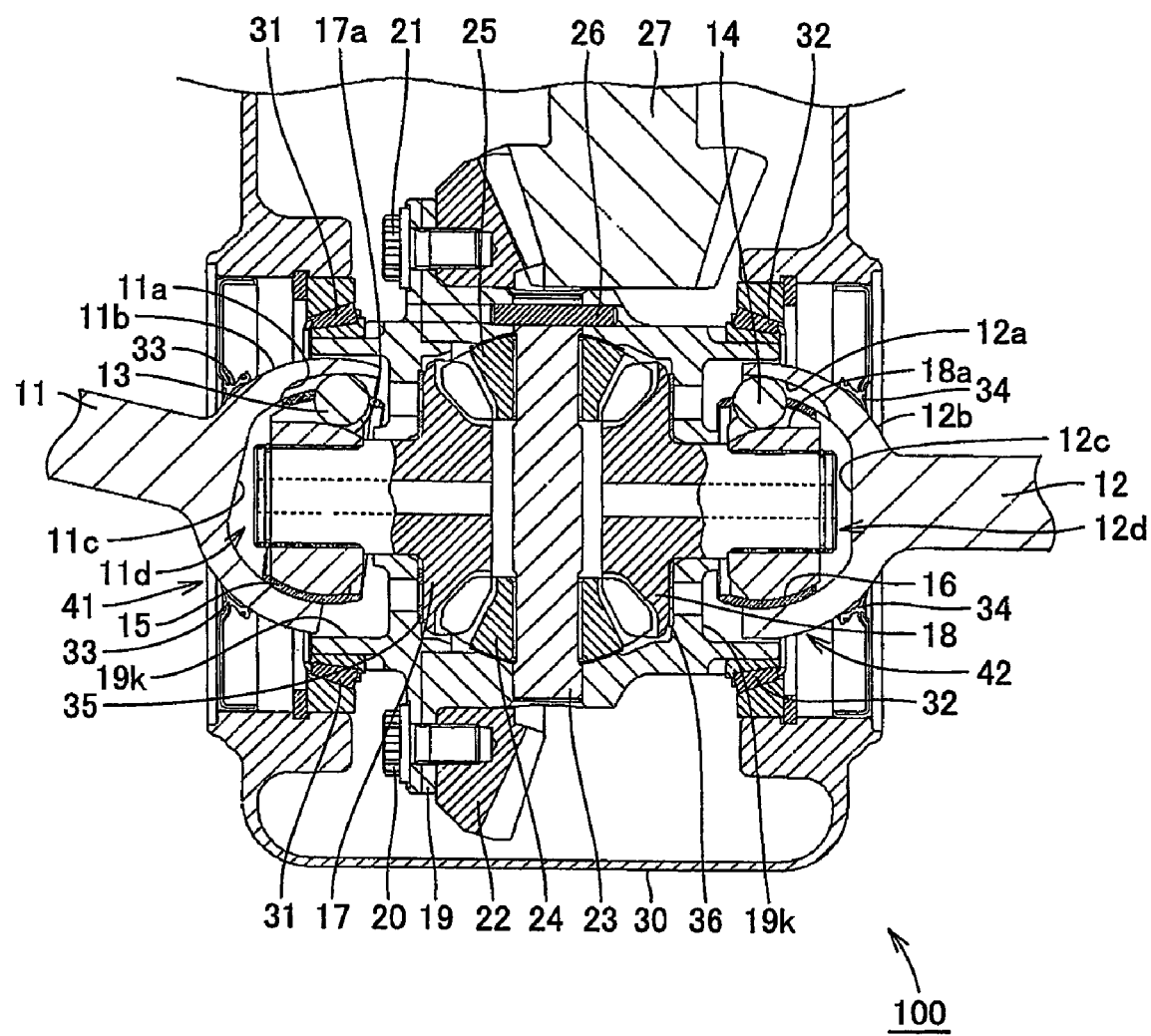
FIG. 1 is a sectional view of a differential gear according to a first embodiment of the present invention.

Embodiments of the present invention will be described hereinafter with reference to the drawings. In the embodiments set forth below, the same or corresponding elements have the same reference characters allotted, and description thereof will not be repeated.

First Embodiment

Referring to FIG. 1, a differential gear 100 according to a first embodiment of the present invention includes drive shafts 11 and 12 identified as a first power transmission member, a diff case 19 identified as a casing provided with an opening 19k that opens towards drive shafts 11 and 12, constant velocity universal joints 41 and 42 connected to drive shafts 11 and 12, and side gears 17 and 18 identified as a second power transmission member connected to drive shafts 11 and 12 via constant velocity universal joints 41 and 42. At the end of drive shafts 11 and 12 at the casing side, outer races 11a and 12a of constant velocity universal joints 41 and 42 are formed integrally. Outer races 11a and 12a are disposed so as to block opening 19k.

The first power transmission member is drive shafts 11 and 12. The casing is diff case 19 of differential gear 100. The second power transmission member is side gears 17 and 18.

Differential gear 100 includes side gears 17 and 18, and drive shafts 11 and 12 identified as the first power transmission member having their ends connected to side gears 17 and 18 via constant velocity universal joints 41 and 42. The ends of drive shafts 11 and 12 have inner surfaces 11c and 12c defining internal cavities 11d and 12d that opens towards side gears 17 and 18. Outer races 11a and 12a of constant velocity universal joints 41 and 42 are formed at inner surfaces 11c and 12c. Inner races 17a and 18a of constant velocity universal joints 41 and 42 are formed at the surface of side gears 17 and 18.

An outer surface 11b of outer race 11a has a spherical configuration. Differential gear 100 further includes seal members 33 and 34 brought into contact with outer surfaces 11b and 12b.

Differential gear 100 includes a diff carrier 30. An input shaft 27 is provided at diff carrier 30. Teeth are formed at the outer surface of input shaft 27.

A ring gear 22 is provided substantially perpendicular to input shaft 27. Ring gear 22 engages with the teeth of input shaft 27, and has a rotation axis located substantially at right angles with the rotation axis of input shaft 27.

Diff case 19 is attached to ring gear 22 by bolts 20 and 21. A pinion shaft 23 is secured in diff case 19 using a pin 26. Two pinion gears 24 and 25 are attached in a rotatable manner to pinion shaft 23. Pinion gear 25 engages with side gears 17 and 18. Shims 35 and 36 are provided between respective side gears 17 and 18 and diff case 19. Diff case 19 is held in diff carrier 30 by bearings 31 and 32, and can rotate in diff carrier 30. Side gears 17 and 18 are attached to drive shafts 11 and 12 via constant velocity universal joints 41 and 42. The rotation axis of drive shafts 11 and 12 can be angled with respect to the rotation axis of side gears 17 and 18. Inner races 17a and 18a, balls 13 and 14, and outer races 11a and 12a constitute constant velocity universal joints 41 and 42, respectively. Constant velocity universal joints 41 and 42 may be a Weiss type joint, a bar field joint, or a tripod joint, or the like. A seal member 33 is provided so as to form contact with an outer surface 11b of outer race 11a. Seal member 33 functions to prevent intrusion of dust and dirt into diff carrier 30. Constant velocity universal joints 41 and 42 are filled with grease that is stored in internal cavities 11d and 12d. Balls 13 and 14 are held in holders 15 and 16.

Inner races 17a and 18a may be formed integrally with side gears 17 and 18, or fitted to side gears 17 and 18. Outer races 11a and 12a have a spherical configuration about the folding center of constant velocity universal joints 41 and 42. Pinion gears 24 and 25 support side gears 17 and 18 rotatably and radially. Seal members 33 and 34 are oil seals.

In the differential gear according to the first embodiment of the present invention of the structures set forth above, outer races 11a and 12a are arranged so as to block opening 19k. As a result, intrusion of dust and dirt into opening 19k can be prevented.

Outer races 11a and 12a of constant velocity universal joints 41 and 42 are formed at inner surfaces 11c and 12c defining internal cavities 11d and 12d. Therefore, constant velocity universal joints 41 and 42 are stored in internal cavities 11d and 12d. As a result, entry of foreign objects to constant velocity universal joints 41 and 42 can be prevented. Furthermore, the provision of seal members 33 and 34 forming contact with external surfaces 11b and 12b prevents dust and dirt from entering by virtue of seal members 33 and 34.

Second Embodiment

Figure 2:
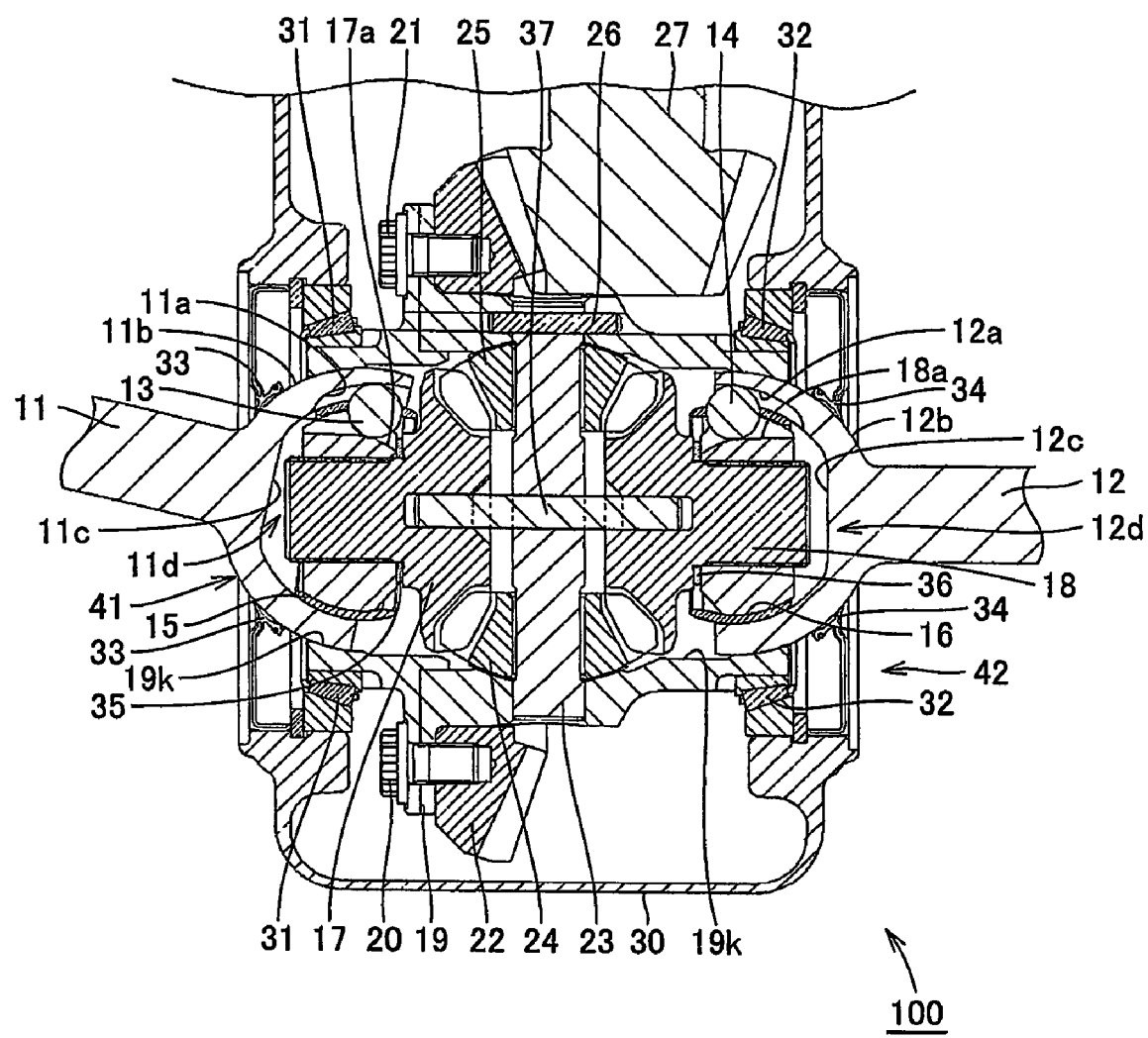
FIG. 2 is a sectional view of a differential gear according to a second embodiment of the present invention.

Referring to FIG. 2, a differential gear 100 according to a second embodiment of the present invention differs from differential gear 100 of the first embodiment in that a pin 37 for registration of side gears 17 and 18 is provided. There is also a difference from differential gear 100 of the first embodiment in that opening 19k has a spherical configuration, and forms contact with outer surface 11b.

Differential gear 100 according to the second embodiment of the present invention structured as set forth above provides advantages similar to those of differential gear 100 of the first embodiment. Further, intrusion of dust and dirt into opening 19k can be prevented by virtue of opening 19k forming contact with outer surfaces 11b and 12b.

Third Embodiment

Figure 3:
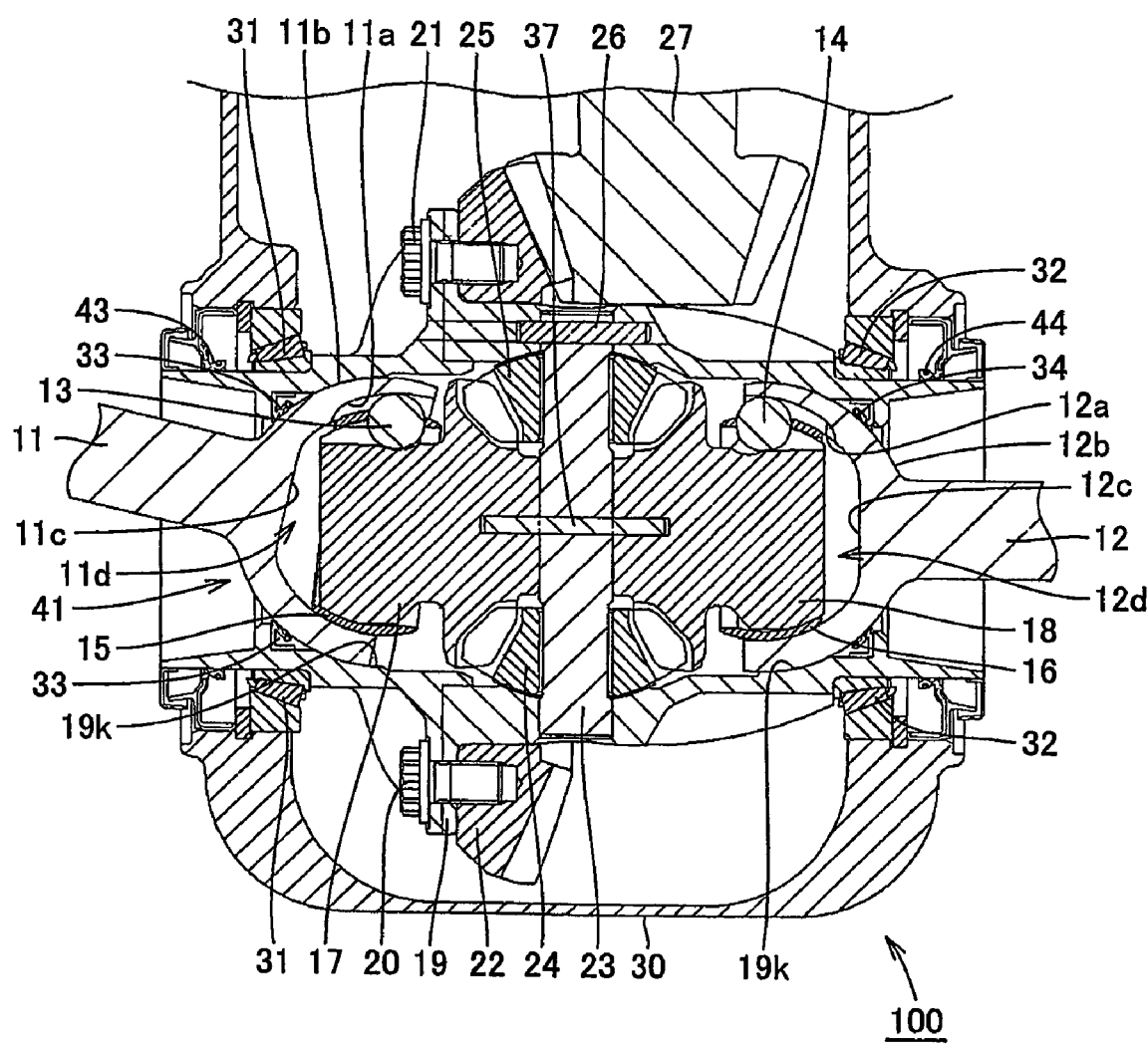
FIG. 3 is a sectional view of a differential gear according to a third embodiment of the present invention.

Referring to FIG. 3, a differential gear 100 according to a third embodiment of the present invention differs from the differential gears of FIGS. 1 and 2 in that additional seal members 43 and 44 are provided between diff case 19 and diff carrier 30. In accordance with this feature, seal members 33 and 34 forming contact with outer surfaces 11b and 12b are provided at diff case 19. Specifically, separate seal structures are provided inside and outside diff case 19 by means of seal members 33 and 34 and seal members 43 and 44. Furthermore, inner races 17a and 18a are formed integrally with side gears 17 and 18.

Differential gear 100 according to the third embodiment of the present invention structured as set forth above provides advantages similar to those of differential gear 100 of the first and second embodiments.

Fourth Embodiment

Figure 4:
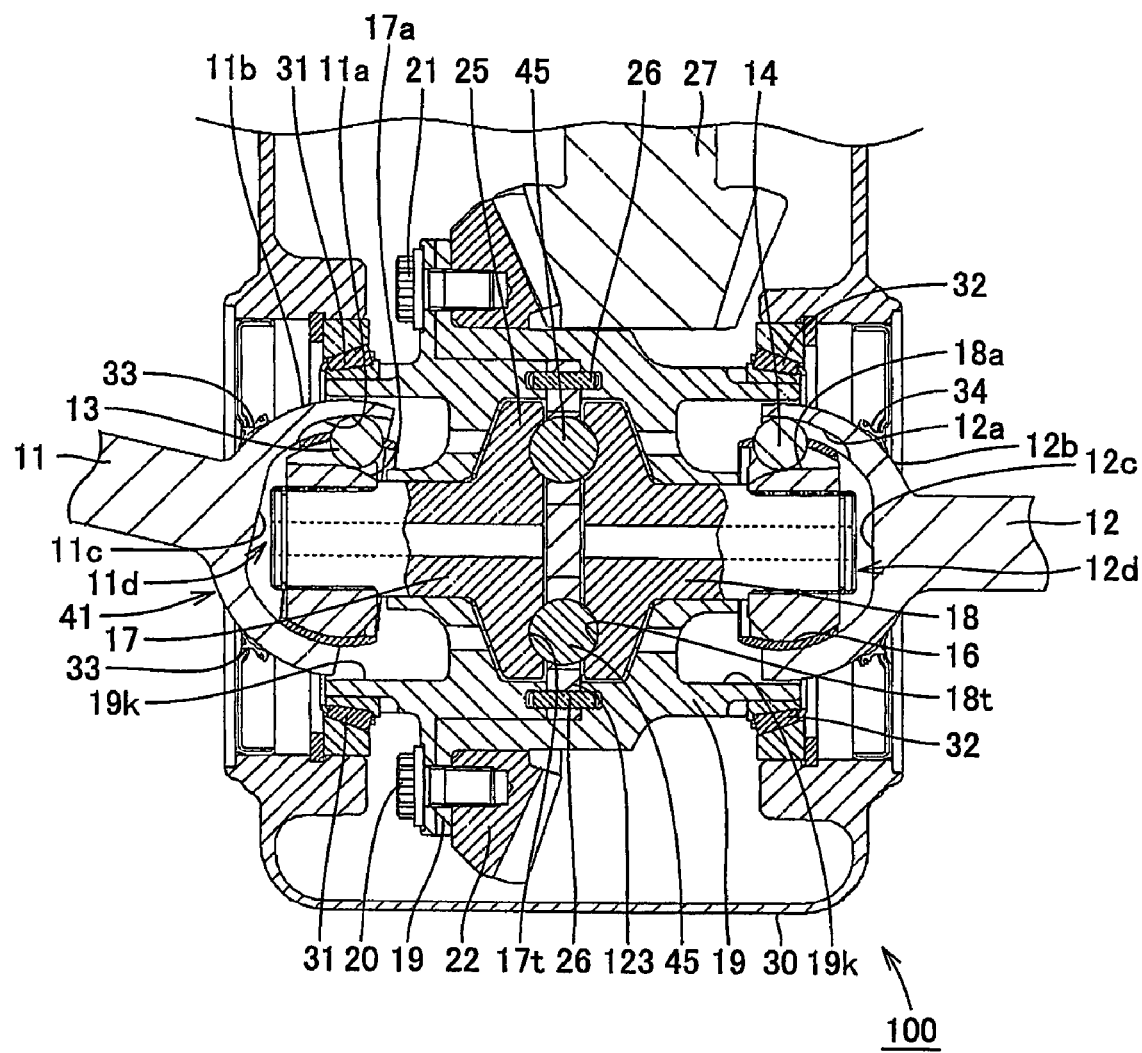
FIG. 4 is a sectional view of a differential gear according to a fourth embodiment of the present invention.

Referring to FIG. 4, differential gear 100 according to a fourth embodiment of the present invention differs from differential gear 100 of the first to third embodiments in that a ball 45 is provided instead of pinion gears 24 and 25 of the first to third embodiments. Ball 45 engages with grooves 17t and 18t provided at side gears 17 and 18 to transmit turning force to side gears 17 and 18. Ball 45 is held at a center plate 24, which turns together with diff case 19.

Differential gear 100 according to the fourth embodiment of the present invention structured as set above provides advantages similar to those of differential gear 100 of the first to third embodiments.

Fifth Embodiment

Figure 5:
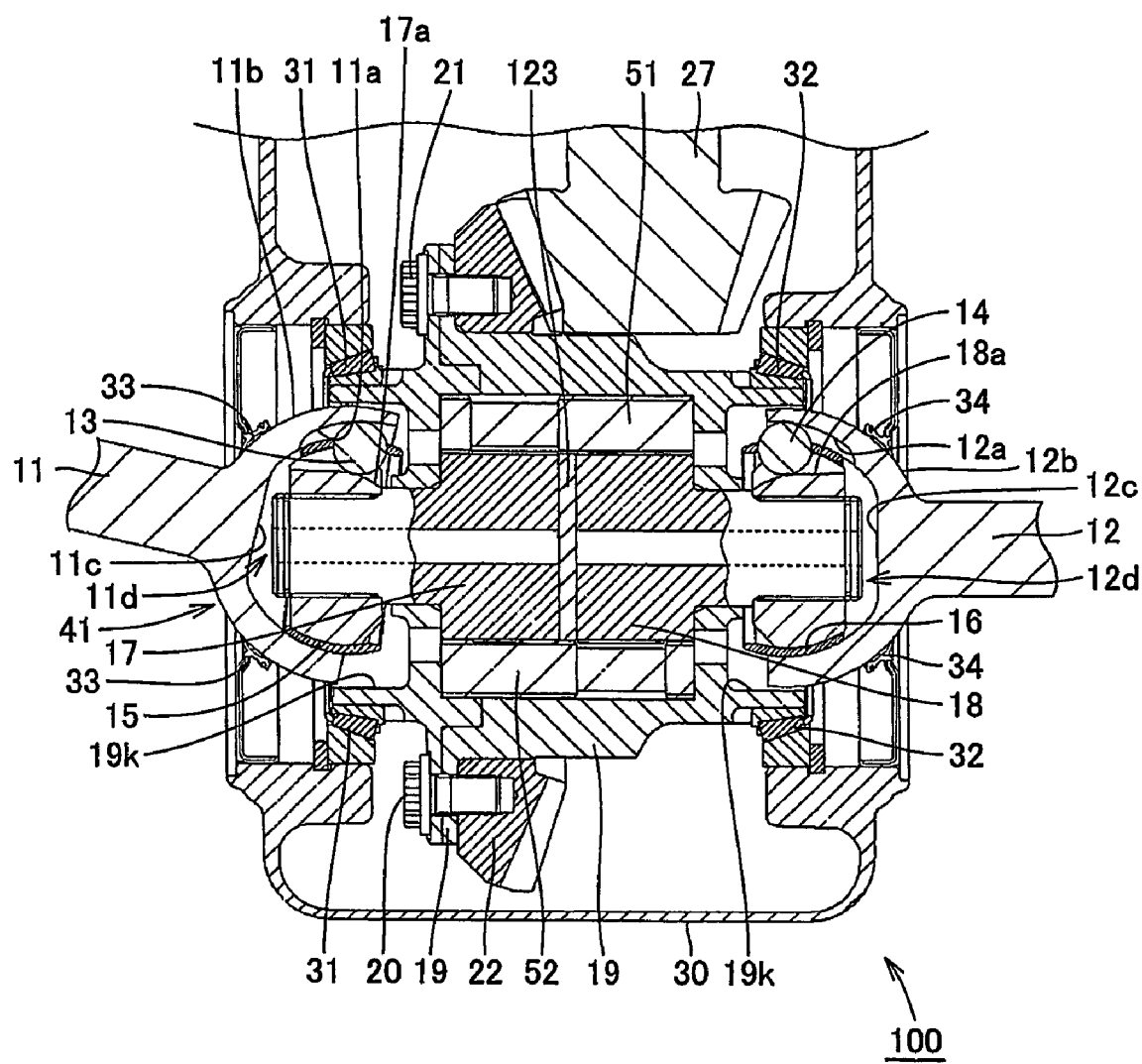
FIG. 5 is a sectional view of a differential gear according to a fifth embodiment of the present invention.

Referring to FIG. 5, a differential gear 100 according to a fifth embodiment of the present invention differs from the differential gear of the first to fourth embodiments in that it is the so-called Torsen (registered trademark) B type. The present invention is also applicable to the Torsen (registered trademark) A type or C type. Differential gear 100 has pinion gears 51 and 52 held at diff case 19. An additional pinion gear not shown is provided so as to engage with pinion gear 51. Furthermore, an additional pinion gear not shown is provided so as to engage with pinion gear 52. Pinion gears 51 and 52 are held at diff case 19 to revolve together with diff case 19. When difference in rotation occurs between side gears 17 and 18, pinion gears 51 and 52 revolve. Pinion gears 51 and 52 have helical teeth formed, which engage with side gears 17 and 18. By virtue of the helical teeth, thrust power is generated in response to pinion gears 51 and 52 revolving. The thrust power causes pinion gears 51 and 52 to be urged against diff case 19. Accordingly, the differential (rotation difference) is limited.

The differential gear according to the fifth embodiment of the present invention structured as set forth above provides advantages similar to those of differential gear 100 of the first to fourth embodiments.

Sixth Embodiment

Figure 6:
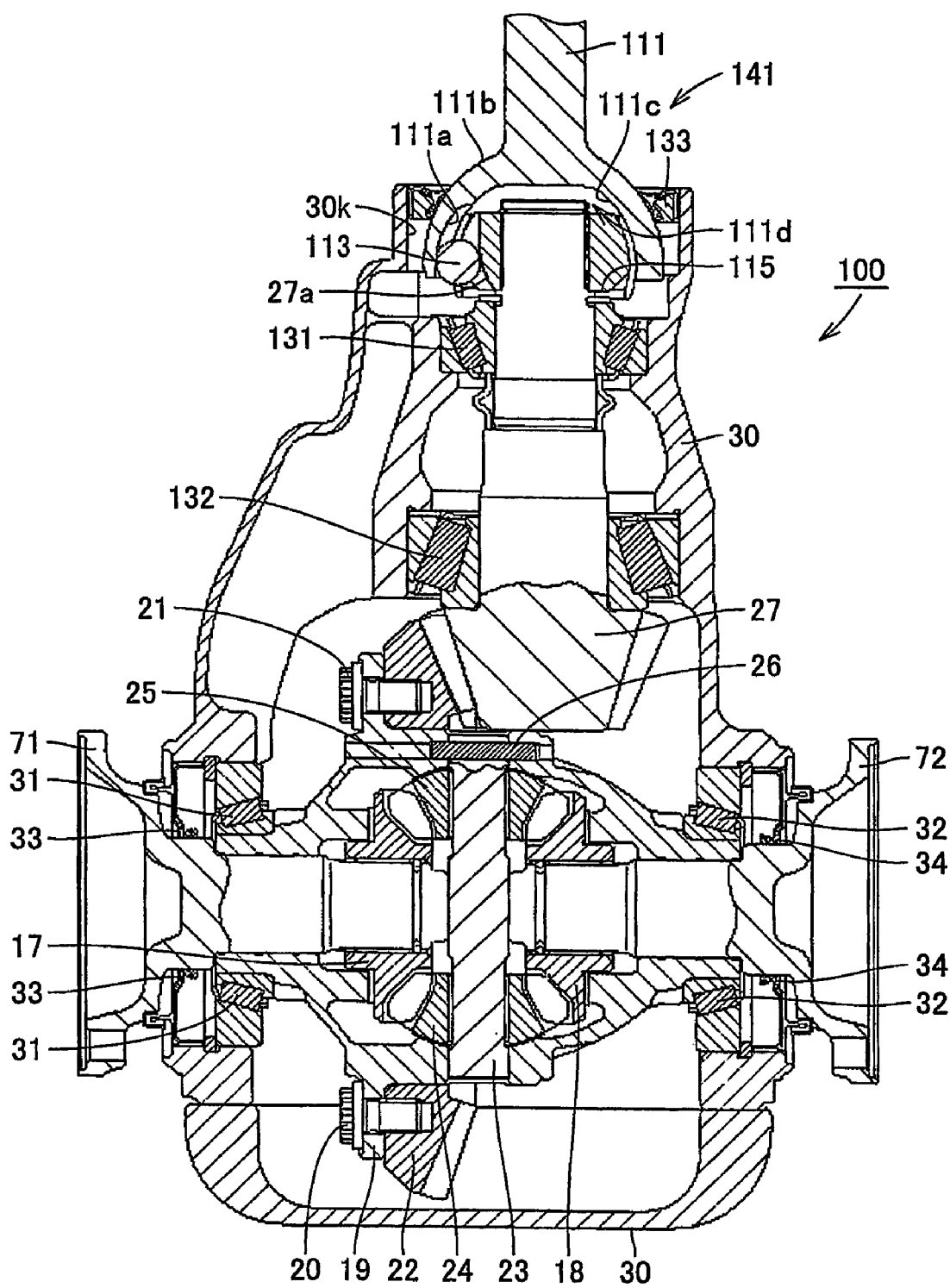
FIG. 6 is a sectional view of a differential gear according to a sixth embodiment of the present invention.

Referring to FIG. 6, a differential gear 100 according to a sixth embodiment of the present invention includes a propeller shaft 111 identified as a first power transmission member, a diff carrier 30 identified as a casing provided with an opening 30k that opens towards propeller shaft 111, a constant velocity universal joint 141 connected to propeller shaft 111, and an input shaft 27 identified as a second power transmission member connected to propeller shaft 111 via constant velocity universal joint 141. An outer race 111a of constant velocity universal joint 141 is formed integrally to the diff carrier side end of propeller shaft 111. An inner race 27a of constant velocity universal joint 141 is formed integrally to input shaft 27. Outer race 111a is arranged so as to block opening 30k.

The first power transmission member is propeller shaft 111, the casing is diff carrier 30 of differential gear 100, and the second power transmission member is input shaft 27 of differential gear 100.

Differential gear 100 includes input shaft 27, and propeller shaft 111 as the first power transmission member connected to input shaft 27 via constant velocity universal joint 141. The end of propeller shaft 111 has an inner surface 111c defining an internal cavity 111d as the opening that opens towards input shaft 27. Outer race 111a of constant velocity universal joint 141 is formed at inner surface 111c. Inner race 27a of constant velocity universal joint 141 is formed at the surface of input shaft 27. An outer surface 111b of outer race 111a has a spherical configuration. Differential gear 100 further includes a seal member 133 forming contact with outer surface 111b.

Input shaft 27 is held at diff carrier 30 by a plurality of bearings 131 and 132. Input shaft 27 is connected to propeller shaft 111 via constant velocity universal joint 141. Constant velocity universal joint 141 may be any of a Weiss type joint, a bar field joint, or a tripod type joint.

Input shaft 27 engages with ring gear 22. Ring gear 22 rotates diff case 19, pinion gears 24 and 25, side gears 17 and 18, and rotation members 71 and 72 connected to side gears 17 and 18. Although a constant velocity universal joint means is not provided at side gears 17 and 18 in FIG. 6, side gears 17 and 18 may correspond to side gears 17 and 18 of the first to fifth embodiments, and have constant velocity universal joint 41 and 42 provided thereto. Although inner race 27a is fitted to input shaft 27, it may be formed integrally instead.

In differential gear 100 according to the sixth embodiment of the present invention structured as set forth above, intrusion of dust and dirt through opening 30k can be prevented since outer race 111a is disposed so as to block opening 30k. It is therefore no longer required to provide the boot as in conventional cases, allowing the apparatus to be reduced in size. Furthermore, the provision of seal member 133 prevents intrusion of dust and dirt into the apparatus, as well as leakage of grease out from the apparatus. Thus, the durability and reliability of the apparatus are improved.

Furthermore, since propeller shaft 111 has an inner surface 111c defining internal cavity 111d, and outer race 111a of constant velocity universal joint 141 is formed at inner surface 111c, constant velocity universal joint 141 is disposed in internal cavity 111d. As a result, leakage of grease and the like from constant velocity universal joint 141 can be prevented.

Seventh Embodiment

Figure 7:
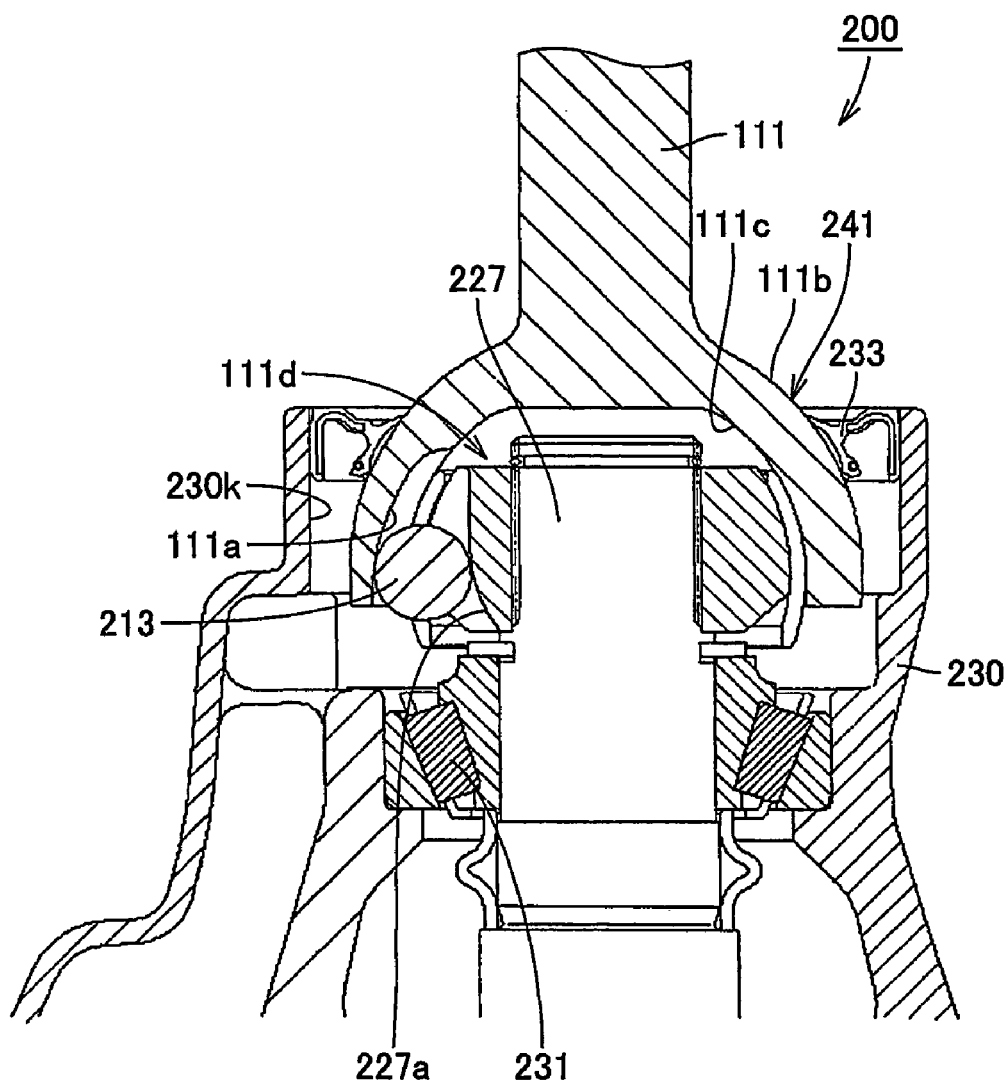
FIG. 7 is a sectional view of a power distribution apparatus according to a seventh embodiment of the present invention.

Referring to FIG. 7, a power distribution apparatus 200 according to a seventh embodiment of the present invention includes a propeller shaft 111 identified as a first power transmission member, a casing 230 provided with an opening 230k that opens towards propeller shaft 111, a constant velocity universal joint 241 connected to propeller shaft 111, and an output shaft 227 identified as a second power transmission member connected to propeller shaft 111 via constant velocity universal joint 241. An outer race 111a of constant velocity universal joint 241 is formed integrally to the casing side end of propeller shaft 111. An inner race 227a of constant velocity universal joint 241 is formed integrally with output shaft 227. Outer race 111a is arranged so as to block opening 230k. An outer surface 111b of outer race 111a has a spherical configuration. Power distribution apparatus 200 further includes a seal member 233 forming contact with outer surface 111b.

Power distribution apparatus 200 includes an output shaft 227, and a propeller shaft 111 is connected to output shaft 227 via constant velocity universal joint 241 The end of propeller shaft 111 has an inner surface 111c defining an internal cavity 111d that opens towards output shaft 227. Outer race 111a of constant velocity universal joint 241 is formed at inner surface 111c. Inner race 227a of constant velocity universal joint 241 is formed at the surface of output shaft 227.

Power distribution apparatus 200 is the so-called transfer, provided between the transmission and the propeller shaft. Power distribution apparatus 200 is installed in the so-called four-wheel drive vehicle or six-wheel drive vehicle. Power distribution apparatus 200 may include or not include a change gear function. Casing 230 of power distribution apparatus 200 is connected to the transmission. A bearing 231 to hold output shaft 270 is provided in casing 230. Although inner case 227a of constant velocity universal joint 241 is fitted at the end of output shaft 227 in the present embodiment, inner race 227a may be formed integrally instead. Inner race 227a is brought into contact with a ball 213. Ball 213 forms contact with outer race 111a. Constant velocity universal joint 241 may be any of a bar field joint, a tripod type joint, or a Weiss type joint. Outer race 111a is formed at the end of propeller shaft 111.

In power distribution apparatus 200 according to the seventh embodiment of the present invention structured as set forth above, intrusion of dust and the like to opening 230k can be prevented even if a boot is not provided since outer race 111a is disposed so as to block opening 230k. As a result, power distribution apparatus 200 can be reduced in size.

Furthermore, since outer race 111a of constant velocity universal joint 241 is formed at inner surface 111c defining internal cavity 111d, constant velocity universal joint 241 is arranged in internal cavity 111d. Accordingly, constant velocity universal joint 241 is protected by internal cavity 111d, and leakage of grease and the like from constant velocity universal joint 241 can be prevented. Thus, a power distribution apparatus 200 having a long life and of high reliability can be obtained.

Eight Embodiment

Figure 8:
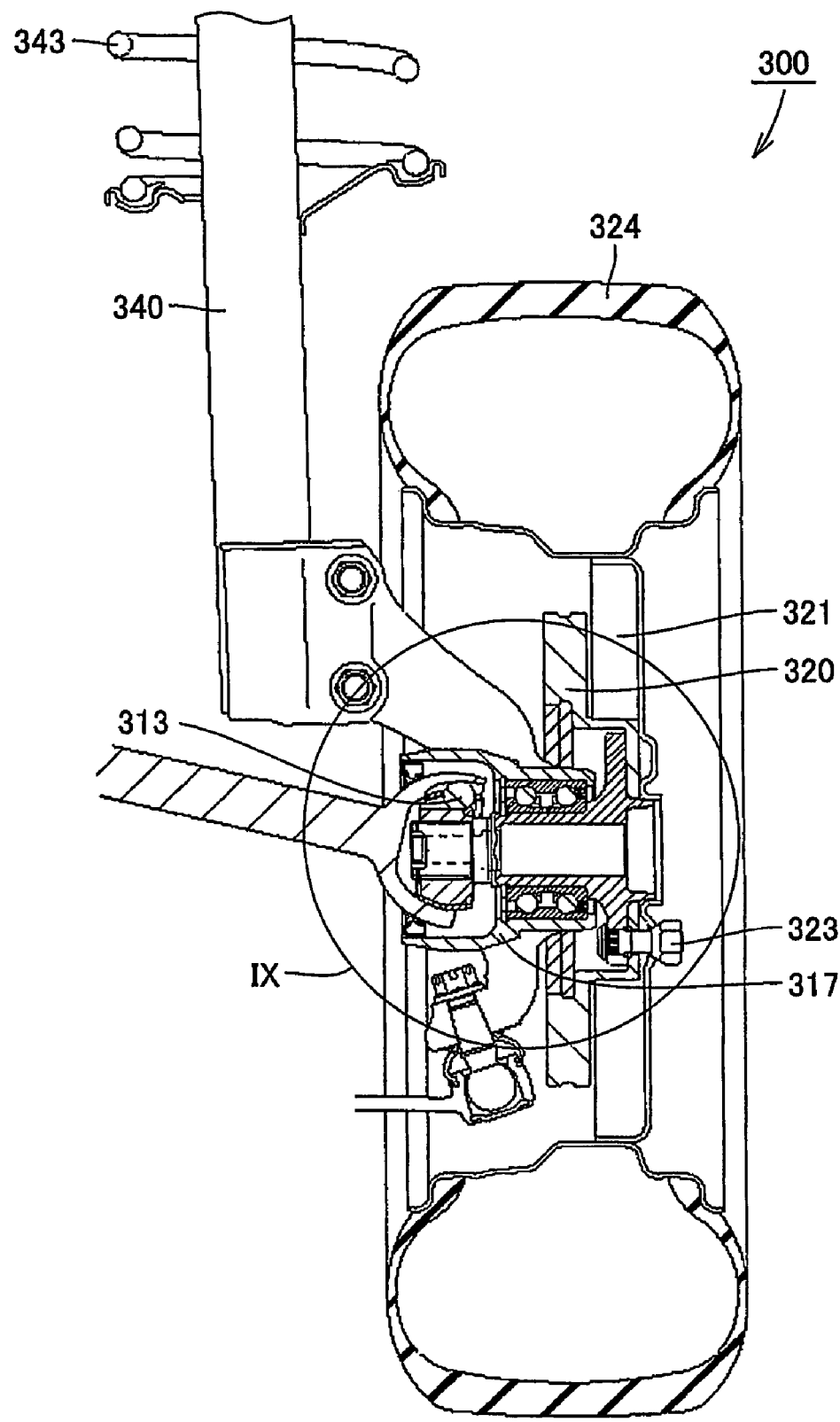
FIG. 8 is a sectional view of a hub apparatus according to an eighth embodiment of the present invention.
Figure 9:
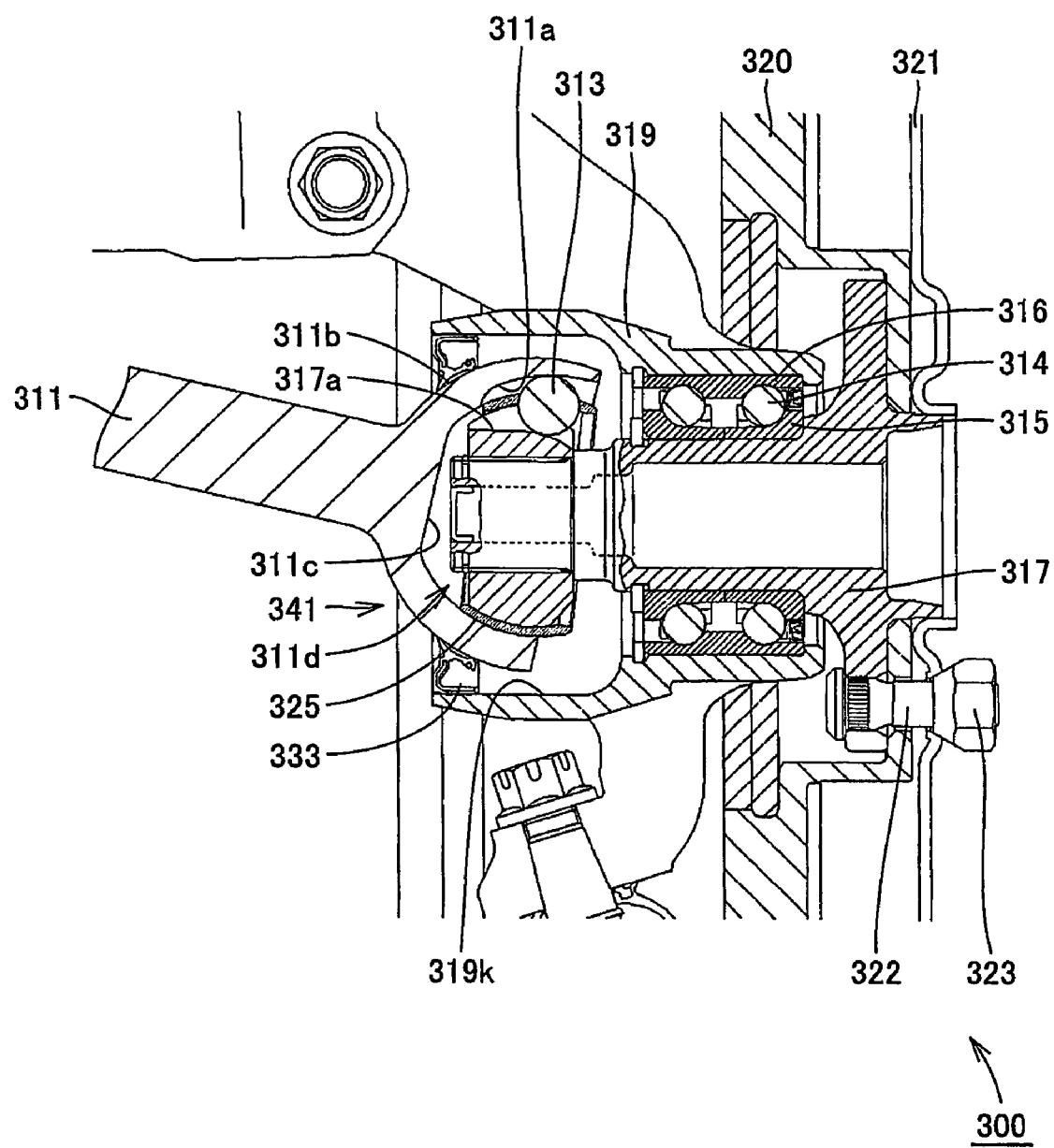
FIG. 9 is a sectional view showing in enlargement the region surrounded by IX in FIG. 8.

Referring to FIGS. 8 and 9, a hub apparatus 300 according to an eighth embodiment of the present invention includes a drive shaft 311 identified as a first power transmission member, a knuckle 319 identified as a casing provided with an opening 319k that opens towards drive shaft 311, a constant velocity universal joint 341 connected to drive shaft 311, and a hub 317 identified as a second power transmission member connected to drive shaft 311 via constant velocity universal joint 341. An outer race 311a of constant velocity universal joint 341 is formed integrally to the knuckle side end of drive shaft 311. An inner case 317a of constant velocity universal joint 341 is formed integrally to hub 317. Outer race 311a is disposed so as to block opening 319k.

An outer surface 311b of outer race 311a has a spherical configuration. Hub apparatus 300 further includes a seal member 333 forming contact with outer surface 311b of outer race 311a.

Hub apparatus 300 includes hub 317, and drive shaft 311 as the first power transmission member connected to hub 317 via constant velocity universal joint 341. The end of drive shaft 311 has an inner surface 311c defining internal cavity 311d that opens towards towards hub 317. Outer race 311a of constant velocity universal joint 341 is formed at inner surface 311c. Inner race 317a of constant velocity universal joint 341 is formed at the surface of hub 317.

A wheel 321 is attached at the center of a tire 324. Wheel 321 is attached to hub 317 by a hub bolt 322 and a wheel nut 323. A disk brake 320 is secured to hub 317. Disk brake 320 rotates together with hub 317, wheel 321 and tire 324.

An inner race 315 is provided at hub 317. Inner race 315 is brought into contact with ball 314. Ball 314 forms contact with outer race 316. Outer race 316 is attached to knuckle 319. Knuckle 319 is supported by a strut 340. Strut 340 is located at the center of a coil 343.

In contrast to the rotation of hub 317, knuckle 319 will not rotate even if hub 317 turns since ball 314 is provided between hub 317 and knuckle 319. Constant velocity universal joint 341 is provided at the end of hub 317. Inner race 317a, a ball 313 and outer race 311a constitute constant velocity universal joint 341. Ball 313 is held by a holder 325. Constant velocity universal joint 341 may be any of a bar field type joint, a tripod joint, or a Weiss type joint.

In hub apparatus 300 according to the eighth embodiment of the present invention structured as set forth above, intrusion of dust and dirt through opening 319k can be prevented since outer race 311a is disposed so as to block opening 319k. Therefore, it is not necessary to provide a boot, and hub apparatus 300 can be reduced in size. Furthermore, the provision of constant velocity universal joint 341 in internal cavity 311d prevents leakage of grease and the like from constant velocity universal joint 341. As a result, the length of life and reliability of the apparatus are improved.

Based on the present invention described in the foregoing, various modifications are possible. The present invention is applicable to an element having constant velocity universal joint means provided between two members, and is not limited to those disclosed in the embodiments. Further, the present invention is applicable, not only to an automobile, but other vehicles, working machinery, and the like.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A power transmission apparatus comprising:
a first power transmission member;
a casing provided with an opening that opens towards said first power transmission member;
a constant velocity universal joint connected to said first power transmission member; and
a second power transmission member connected to said first power transmission member via said constant velocity universal joint; wherein
an outer race of said constant velocity universal joint is formed integrally to a casing side end of said first power transmission member;
an inner race of said constant velocity universal joint is formed integrally to said second power transmission member;
said outer race is disposed so as to block said opening;
said first power transmission member includes a drive shaft;
said casing includes a diff case of a differential gear; and
said second power transmission member includes a side gear.

2. The power transmission apparatus according to claim 1, wherein an outer surface of said outer race has a spherical configuration,
said power transmission apparatus further comprising a seal member forming contact with a surface of said opening and an outer surface of said outer race.

3. A power transmission apparatus comprising:
a first power transmission member;
a casing provided with an opening that opens towards said first power transmission member;
a constant velocity universal joint connected to said first power transmission member; and
a second power transmission member connected to said first power transmission member via said constant velocity universal joint; wherein
an outer race of said constant velocity universal joint is formed integrally to a casing side end of said first power transmission member;
an inner race of said constant velocity universal joint is formed integrally to said second power transmission member;
said outer race is disposed so as to block said opening;
said first power transmission member includes a propeller shaft;
said casing includes a diff carrier of a differential gear; and
said second power transmission member includes an input shaft of said differential gear.

4. The power transmission apparatus according to claim 3, wherein an outer surface of said outer race has a spherical configuration,
said power transmission apparatus further comprising a seal member forming contact with a surface of said opening and an outer surface of said outer race.

5. A differential gear comprising:
a side gear; and
a first power transmission member connected to said side gear via a constant velocity universal joint; wherein
an end of said first power transmission member has an inner surface defining an internal cavity that opens towards said side gear;
an outer race of said constant velocity universal joint is formed at said inner surface; and
an inner race of said constant velocity universal joint is formed at a surface of said side gear.

6. A differential gear comprising:
an input shaft in meshing engagement with a ring gear; and
a propeller shaft connected to said input shaft via a constant velocity universal joint; wherein
an end of said propeller shaft has an inner surface defining an internal cavity that opens towards said input shaft;
an outer race of said constant velocity universal joint is formed at said inner surface; and
an inner race of said constant velocity universal joint is formed at a surface of said input shaft.

* * * * *